(12) United States Patent
Stack et al.

(10) Patent No.: US 7,079,912 B2
(45) Date of Patent: Jul. 18, 2006

(54) SYSTEM AND METHOD FOR HIGH SPEED CONTROL AND REJECTION

(75) Inventors: James Stack, Richmond, VA (US); Herbert C. Longest, Jr., Midlothian, VA (US); Nathaniel Frampton, Pearl River, LA (US)

(73) Assignee: Philip Morris USA Inc., Richmond, VA (US)

(*) Notice: Subject to any disclaimer, the term of this patent is extended or adjusted under 35 U.S.C. 154(b) by 132 days.

(21) Appl. No.: 10/302,972

(22) Filed: Nov. 25, 2002

(65) Prior Publication Data

US 2004/0102864 A1    May 27, 2004

(51) Int. Cl.
*G06F 19/00* (2006.01)
*A24C 5/32* (2006.01)

(52) U.S. Cl. .................. 700/110; 700/117; 131/280; 131/907; 131/910

(58) Field of Classification Search ........ 700/108–110, 700/115, 117, 17, 83; 131/208, 910, 905–908; 356/430, 237.1, 237.2; 382/141; 340/679; 209/555, 564, 565, 535
See application file for complete search history.

(56) References Cited

U.S. PATENT DOCUMENTS

| 3,867,283 | A | * | 2/1975 | Horn et al. ................. 209/555 |
|---|---|---|---|---|
| 4,463,767 | A | | 8/1984 | Seragnoli |
| 4,522,616 | A | | 6/1985 | Hyde et al. |
| 4,595,027 | A | | 6/1986 | Higgins et al. |
| 4,724,429 | A | * | 2/1988 | Millen et al. ............... 340/679 |
| 4,858,626 | A | | 8/1989 | Neri |
| 5,353,357 | A | * | 10/1994 | Longest, Jr. et al. ........ 382/141 |
| 5,432,600 | A | * | 7/1995 | Grollimund et al. ..... 356/237.2 |
| 5,582,192 | A | | 12/1996 | Williams, III |
| 6,020,969 | A | * | 2/2000 | Struckhoff et al. .......... 356/430 |
| 6,213,128 | B1 | * | 4/2001 | Smith et al. ................. 131/280 |

FOREIGN PATENT DOCUMENTS

WO    WO 00/16647    3/2000

OTHER PUBLICATIONS

Michael Babb, editor, Worried About windows, Control Engineering, Apr. 1992, p. 39.

(Continued)

*Primary Examiner*—Leo Picard
*Assistant Examiner*—Steven R Garland
(74) *Attorney, Agent, or Firm*—Buchanan Ingersoll PC

(57) ABSTRACT

The present invention provides a system and method for high speed control and rejection of out-of-specification products, such as cigarettes, in a manufacturing process. Sensors are placed at strategic locations along a production line, with the signals from the sensors being directed to a high speed processor, with multiple sensor inputs and controlled by software algorithms to process the sensor signals and to direct control signals to the production line equipment. Control signals can both eject non-conforming products and also modify machine settings to produce a product in closer compliance with specifications.

26 Claims, 12 Drawing Sheets

OTHER PUBLICATIONS

Dr. Elmar Verhaag, Concepts for Automation with PC on Cigarette Makers and Tobacco Processing Equipment, head of Dept for Electronics and Automation Design, HAUNI-Werke Körber & Co.KG., pp. 162-172.

Charles J. Murray, Long Shunned, PCs make Headway on the Factory Floor, EE Times, Apr. 4, 2002, pp. 1-5, Chicago, Illinois.

Charles J. Murray, Industrial World Opens Windows on Factory Floor, EE Times, Mar. 9, 2001, pp. 1-5, Chicago, Illinois.

Nat Frampton, President, Real Time Development Corp., Windows CE 3.0 Hits the Factory Floor, EE Times, Jun. 29, 2000, pp. 1-6, Sidell, Louisiana.

Nat Frampton, President, Real Time Development Corp., Hard Real times-Tips and Tricks and Some Cool New Features, Microsoft Windows Embedded, Oct. 24, 2001, pp. 1-4.

Notification of Transmittal of International Preliminary Report on Patentability dated Mar. 16, 2005 for PCT/US03/37630.

* cited by examiner

| ID | Name | Location | Port | # Reject | Enabled | On Value |
|---|---|---|---|---|---|---|
| 1 | Loose End | 105 | 1 | 1 | OFF | TRUE |
| 2 | Metal | -2 | 2 | 6 | OFF | TRUE |
| 3 | Splice | -23 | 3 | 4 | OFF | TRUE |
| 4 | Missing Filter | 135 | 4 | 3 | OFF | TRUE |
| 5 | Air Leak | 212 | 5 | 1 | OFF | TRUE |
| 6 | Eject Button | 230 | 6 | 1 | OFF | TRUE |
| 7 | Band Missing | 155 | 4 | 11 | OFF | TRUE |
| 8 | test 2 | 174 | 1 | 1 | OFF | TRUE |

FIGURE 10

SYSTEM AND METHOD FOR HIGH SPEED CONTROL AND REJECTION

BACKGROUND OF THE INVENTION

1. Field of the Invention

The present invention relates to machine control and, more specifically, to a system and method for high speed control and rejection of out-of-specification products during a manufacturing process.

2. Description of the Related Art

In all phases of manufacturing, quality control has become an issue of increasing importance for many reasons, including, of course, a desire to produce a quality product which will satisfy consumer demand and for which consumers will be willing to pay a reasonable price. However, quality control in the manufacturing process can also help manage production costs, can speed the manufacturing process, and can avoid problematic issues with the finished product following the manufacturing process.

While much of the following discussion is directed to the details of implementing the present control and rejection system within cigarette manufacturing and packaging processes, the preferred features of exemplary embodiments of the invention are applicable to many types of processing and production environments where quality control and high speed management of the production and/or manufacturing process is important.

Contemporary cigarette manufacturing, or making, is a high speed process wherein literally thousands of individual cigarettes can be made from shredded tobacco, rolls of cigarette paper, and, optionally, filters, each minute on individual cigarette making machines. Hauni and Molins are just two of the suppliers of cigarette making equipment to the cigarette manufacturers throughout the world. FIG. 1 shows an example of a cigarette making machine 100, wherein tobacco enters the machine at 102, is wrapped with cigarette paper at 106 forming a continuous rod, cut into single or double-length cigarettes at 108, appended with filters from hopper 120, and ultimately output at 110 to be packaged into packs and cartons of cigarettes. At various points along the continuous production line represented by stations 102–110, sensors detect various conditions related to the quality and make-up of the cigarette. For example, 112 represents a sensor location that determines the density of the tobacco rod forming a particular cigarette. If the rod is determined to be too heavy, for example, then too much tobacco is being used, which can be wasteful and, accordingly, expensive to the manufacturer. In response to the determination that the rod is too dense or too heavy, a control signal can be sent to a trimmer at location 114 to adjust the amount of tobacco being shaved from the tobacco flow, thereby thinning the flow to acceptable specifications. Similarly, at 116 a sensor can detect the dilution value for individual cigarettes by sensing the amount of resistance necessary to draw a flow of air through the finished cigarette. If the resistance is outside the specification range as being too high or too low, that particular cigarette is flagged for ultimate ejection at a rejection station 118. Further sensors can detect, for example, whether any metal is present in the tobacco, whether there is a splice in the cigarette wrapping paper, whether an end of a cigarette rod has loose tobacco, or whether the filter is properly attached or is missing.

Therefore, during the high speed manufacture of cigarettes and like products, quality control parameters can be sensed and reactive measures can be taken to modify the production process or reject the out-of-specification products, all without shutting down the production line. To accomplish this control and rejection process in present day cigarette making machines, special purpose controllers (hereinafter "SPC's") are utilized to interpret the signals from the various sensors, such as sensors 112 and 116, and determine, through processor(s) within the SPC's, appropriate action to take. While not expressly shown in FIG. 1, each SPC is typically located within the manufacturing device relatively close to the sensor providing input to the SPC. One problem with this technique is that the SPC's are typically designed to control and./or measure only one parameter in the manufacturing process. If more than one parameter needs to be measured or controlled, separate SPC's must be utilized for each parameter. Furthermore, SPC's have limited memory, which acts to compromise both the functionality of the SPC and the retention of sensory and processing data. Additionally, SPC's are relatively expensive, in that a typical SPC for a single function can cost over $10,000. More importantly, however, SPC's are limiting in that a single SPC assembly, including a processor, memory, and input/output (hereinafter "I/O") circuitry, is typically dedicated to a single function, such as sensing the weight or density of the tobacco rod at 112. The components comprising the SPC assembly are often specifically selected for the particular sensing and control function, with specific circuit boards, wiring, components, and switch settings being selected based on the intended function of that SPC. Modification, adjustment, and repair of the SPC's is therefore difficult, time-consuming, and expensive, often requiring physical intervention at the SPC itself, which in turn often requires shut-down of the production line.

SUMMARY OF THE INVENTION

The present invention is directed toward an open extensible system for high speed control and rejection of out-of-specification products, such as cigarettes, in a manufacturing process. Sensors are placed at strategic locations along a production line, with the signals from the sensors being directed to a high speed processor, with multiple sensor inputs and controlled by software algorithms to process the sensor signals and to direct control signals to the production line equipment. Control signals can both eject non-conforming products and also modify machine settings to produce a product in closer compliance with specifications.

In accordance with one aspect of the exemplary embodiments, a method for controlling the manufacture of a product includes: sensing at least one condition associated with the quality of a product being manufactured on a manufacturing device; transmitting a sensor signal representative of the sensed condition to a central processor; comparing, at the central processor, the transmitted sensor signal against a standard associated with the sensed condition; and transmitting a control signal to a controller on the manufacturing device should the comparison against the standard indicate an out-of-standard condition.

Exemplary embodiments are directed toward an integrated system and method for providing reactive equipment control, whereby product processing on a manufacturing device is controlled by a one or more algorithms operating on a single processor, including the steps of tracking the processing of a product on a manufacturing device; ejecting non-conforming products from the manufacturing device; and controlling the processing steps on the manufacturing device, wherein the ejecting and controlling steps are based on sensor signals initiated during the tracking step and wherein the tracking, ejecting, and controlling steps are implemented on a single processor.

Additional exemplary embodiments include an electronic platform for providing high speed reactive control of a manufacturing device, the electronic platform comprising a plurality of sensors positioned on a manufacturing device for sensing a plurality of conditions associated with the manufacturing of a product on the manufacturing device; a plurality of controllers positioned on the manufacturing device for controlling a plurality of functions associated with the manufacturing of a product on the manufacturing device; and a central processor comprising at least a processor, a memory, a computer readable memory comprising one or more algorithms, an input path, and an output path, wherein sensor signals from the plurality of sensors are input to the central processor via the input path and are processed by the one or more algorithms, and wherein control signals are output via the output paths to the controllers based on the processing of the sensor signals by the algorithms.

An alternative exemplary embodiment is directed toward a system for integrated inspection and control of a manufacturing process, wherein the system includes a machine for manufacturing a product; a plurality of sensors for inspecting the products being manufactured by the machine and for transmitting measurement signals; a processor for receiving the measurement signals transmitted from each of the inspection sensors; a plurality of controllers for modifying the manufacturing process on the machine, wherein the processor evaluates the received measurement signals against one or more standards and transmits control signals to one or more of the plurality of controllers to maintain the manufacturing process within performance standards.

In yet another embodiment, there is a data structure for displaying the processing of a product through a manufacturing device, including a tracking array, wherein each element of the array is mapped through manufacturing device timing signals to segments of a product moving through a production line on a manufacturing device; pointers to locations in the array representative of ports on the manufacturing device; and appearance elements which change the displayed appearance of array elements as the product segments represented by the array elements pass rejection ports on the manufacturing device where the product is ejected from the production line.

As a further exemplary embodiment, there is a computer readable medium encoded with software to provide reactive equipment control, whereby product processing on a manufacturing device is controlled by a one or more algorithms operating on a single processor, including tracking the processing of a product on a manufacturing device; ejecting non-conforming products from the manufacturing device; and controlling the processing steps on the manufacturing device, wherein the ejecting and controlling steps are based on sensor signals initiated during the tracking step and wherein the tracking, ejecting, and controlling steps are implemented on a single processor.

BRIEF DESCRIPTION OF THE DRAWINGS

Various objects and advantages of embodiments of the invention will become more apparent and more readily appreciated from the following description of the preferred embodiments, taken in conjunction with the accompanying drawings, wherein like reference numerals have been used to designate like elements, and wherein:

FIG. 10 is an exemplary screen display of the sensor location setup and display feature;

DETAILED DESCRIPTION OF THE PREFERRED EMBODIMENTS

In the following description, for purposes of explanation and not limitation, specific details are set forth in order to provide a thorough understanding of the invention. However, it will be apparent to one skilled in the art that the invention may be practiced in other embodiments that depart from these specific details. In other instances, detailed descriptions of well-known methods, devices, and circuits are omitted so as not to obscure the description of the invention.

Figure 1:
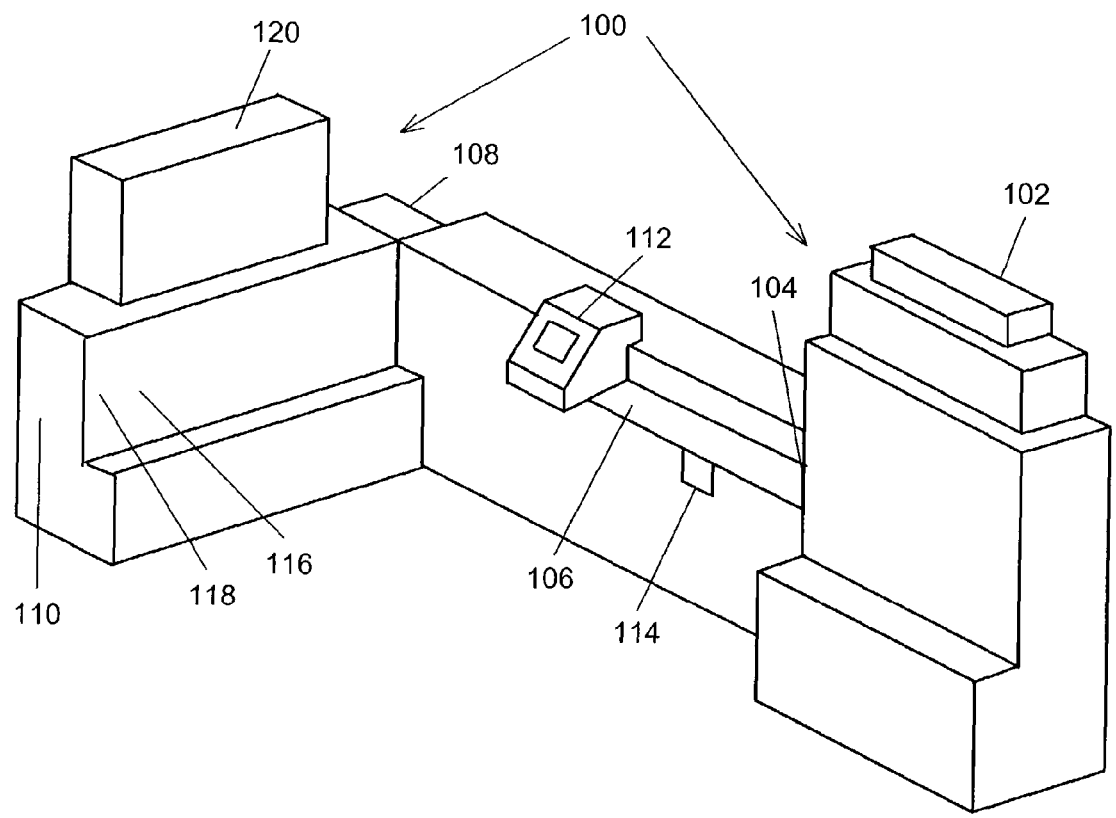
FIG. 1 shows a depiction of a cigarette manufacturing system of the prior art.
Figure 2:
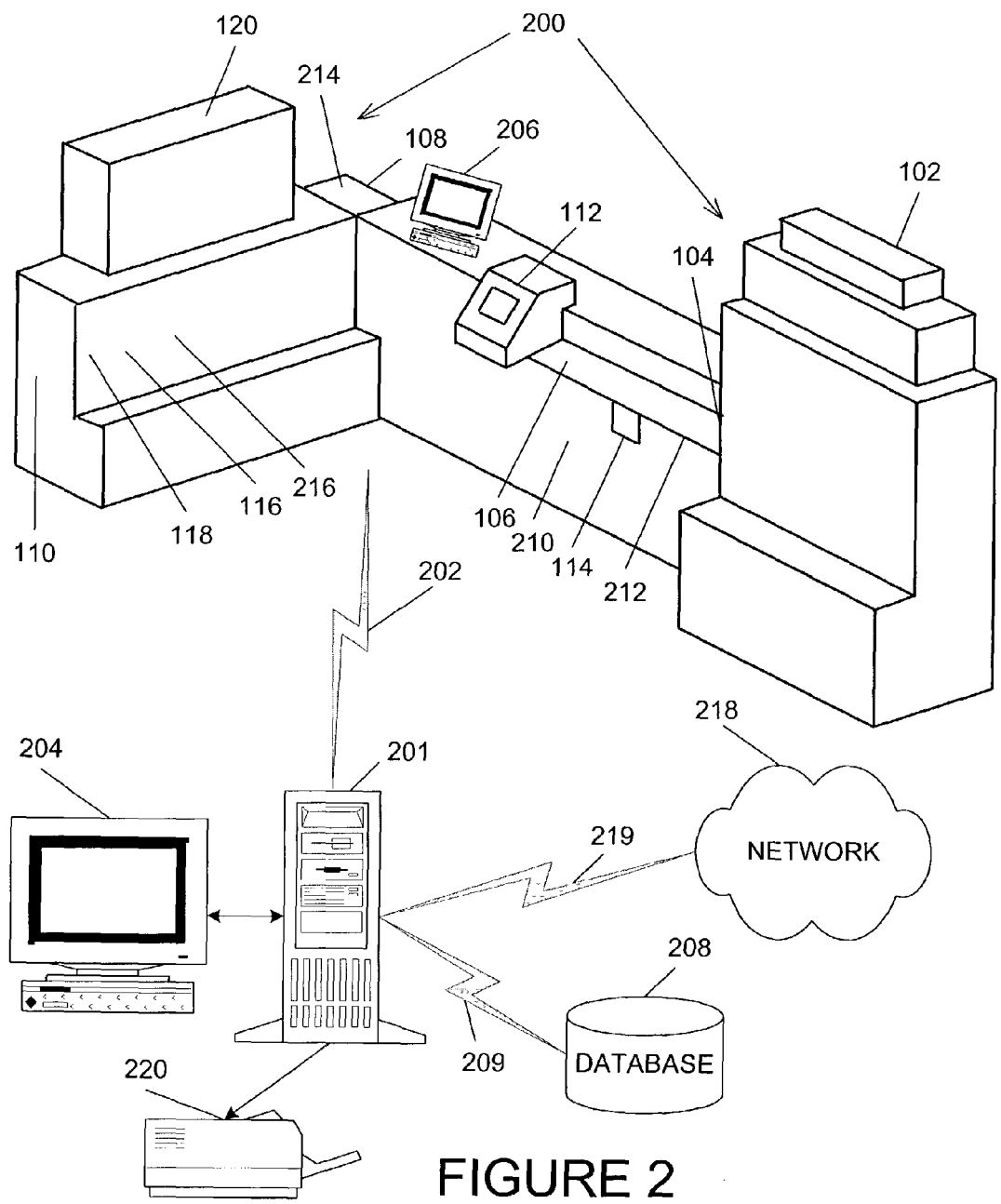
FIG. 2 shows an exemplary cigarette manufacturing system into which the control and rejection system of the invention is implemented.

Referring now to FIG. 2, there is shown an exemplary cigarette manufacturing system into which a control and rejection system according to a preferred embodiment of the invention can be implemented. Exemplary embodiments will be explained in conjunction with a description of how individual cigarettes are made on a cigarette making machine 200. While this description is directed toward the operation of embodiments in conjunction with a cigarette manufacturing device 200, it will be appreciated that exemplary embodiments can be implemented on any device to which sensors can be attached or integrated to measure operational indicias of performance and on which controls can be implemented to remotely modify the operational parameters of the device.

Loose tobacco enters the machine 200 at 102 and is formed into a continuous tobacco rod at 104. The rod passes over a cutter 114 where the rod is shaved by a trimmer wheel 114 to a desired thickness. The trimmer 114 can be an ecreteur in the form of a non-planar wheel with scalloped edges that vary the weight of each cigarette-length portion of the tobacco rod such that the two ends of the cigarette rod will be denser than the middle of the cigarette rod for purposes of subsequent attachment of a filter at one end of the cigarette rod and to minimize the risk of loose tobacco at the other end. Cigarette paper is applied at 106 from a roll to encircle and to be glued around the tobacco rod. As one roll of cigarette paper is used up, the leading edge of a replacement roll is spliced onto the end of the roll of paper being exhausted to permit continuous operation of the machine 200. A sensor 210 is positioned to detect the existence of a splice in the strip of cigarette paper and, upon detecting a splice, sends a signal to the processor 201 along a signal path 202. Optionally, the sensor at 210 can also send a signal to the processor 201 when the trailing end of the splice has passed the sensor.

The signal path 202 can be any form of electronic communication media, such as hard-wired, wireless, or optical communication lines and can be one, multiple, or a combination of such lines. The processor 201 is configured as a single, central computer to accept the sensor signals from all the sensors located on the machine 200 and to transmit control signals back to the controllers on the machine 200. Furthermore, while the processor 201 is preferably proximate to the machine 200, it can also be geographically remote from the machine 200 without detracting from the features or functionality of exemplary embodiments. Additionally, the proximity of the processor 201 to the machine 200 can include the processor 201 being located within the footprint of the machine 200. As will be appreciated by those of ordinary skill in the art, the processor 201 can be comprised of one or more co-processors or the like within a single, central computer without detracting from the preferred features of exemplary embodiments.

Figure 7:
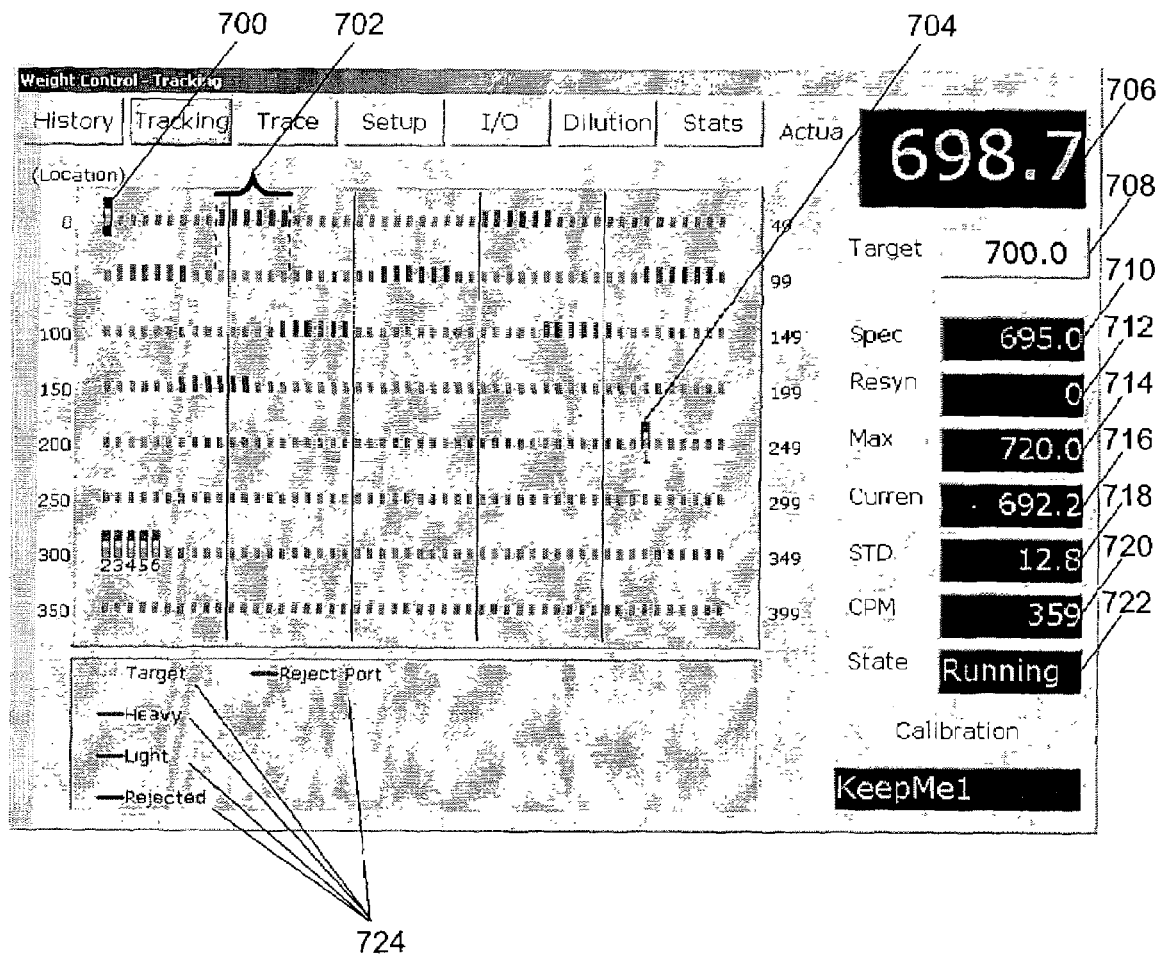
FIG. 7 is an exemplary screen display of a portion of a tracking array.

The cigarette machine 200 is typically driven by one or more electrical motors. An encoder can be located on a primary drive shaft of the machine 200 and can emit timing signals that are also sent or transmitted to the processor 201 across the signal path 202. The processor 201 maintains a tracking array in memory and/or storage, the tracking array preferably being a positional data structure of information that maps, through use of the timing signals, to finite portions of the tobacco rod as the rod passes through the machine 200, first as the rod is a continuous rod of tobacco and ultimately as the rod is reformed into individual finished cigarettes, optionally with attached filters. The array itself can easily be 10,000 elements or more in size and is limited only by the memory available to the processor 201. Additionally, the depth of the mapping of the rod can be controlled by the operator of the machine 200 or the processor 201 to be as detailed as desired. For example, under a preferred embodiment, each cigarette rod, measuring, for example 80 millimeters in length, can be segmented into 24 portions. Each such segment for each cigarette rod along the continuous tobacco rod can be mapped to a corresponding, unique element on the tracking array. An exemplary image of a portion of a tracking array is shown in FIG. 7, and the tracking array will be discussed in more detail in conjunction with FIG. 7.

Referring again to the splice detection sensor 210, upon detecting the presence of a splice in the cigarette paper, the sensor 210 transmits a signal across the communication path 202 to the processor 201. Upon receipt and recognition of the signal from sensor 210, the processor 201 invokes an appropriate algorithm from memory or storage to flag a section of the tobacco rod, by means of mapping with the tracking array, for ultimate ejection from the machine 200. In particular, an algorithm in memory of the processor 201 extrapolates the position of the splice to the position on the tobacco rod where the splice will be located after the wrapping of the rod with the cigarette paper. The elements of the tracking array that correspond to the length of tobacco rod covered by the splice will be flagged for rejection because cigarettes with paper splices are not intended to be packaged for delivery to customers.

The algorithm controlling the rejection of the cigarettes based on the paper splice can function by one of several methods. A paper splice can be known to be long enough to cover up to three contiguous cigarettes, for example. Therefore, the algorithm will flag the tracking array elements associated with three contiguous cigarettes, beginning with the cigarette on which the splice first appears, based on the sensor 210 signal sent to the processor 201 and the timing signals being sent to the processor 201. Optionally, the algorithm can be set to also reject the cigarette before and after the 3-cigarette stream of spliced product. Alternatively, if the sensor 210 sends a signal at the beginning and at the end of the splice, the algorithm does not need to flag three cigarettes for rejection and, instead, flags in the tracking array all cigarettes corresponding to the timing signals between the start and end signals sent by the sensor 210. Additionally, the algorithm can expand the rejection to include at least the cigarette in front of the splice and the cigarette being produced after the splice.

Following the wrapping of the tobacco rod with cigarette paper, the rod is checked at location 112 for proper weight. The entire process associated with measuring and rejecting non-conforming cigarette rods based on weight is known as weight control. As discussed above as regards the ecreteur wheel at 114, the weight of a cigarette is not constant along the length of the cigarette. A sensor 112 can take weight measurements for each of the segments into which each cigarette rod has been apportioned, such as 24 segments. In some machines 200, the weight measurement of the rod segments is accomplished in the form of density measurements. Each of these measurements in the form of an electronic signal are send to the processor 201 across the communication link 202 and are added to the tracking array in their relative location on the tracking array based on the timing signals. On the processor 201, an algorithm matches the measured weight against a predetermined standard weight established for that particular segment of the cigarette rod. If the measured weight is outside the weight standard for the type of cigarette being made as being either too high or too low, the entire cigarette can be flagged on the array, by the processor, as to be rejected. In another embodiment, the weight control/rejection algorithm can be more complex and additional factors can be considered in the rejection analysis. For example, the algorithm can sum the weight deviations from the standard weight range per segment and can signal rejection only when the sum of the deviation exceeds a standard. Because the algorithms reside on a central processor 201 and are in part parameter-driven by limits and/or ranges that can be operator-controlled, the rejection control and therefore the quality control of the machine 200 can be modified in real time to adjust for changing conditions and/or changing requirements. Further, because the processor 201 has available to it and its algorithms information transmitted from a plurality of different sensors on and proximate to the machine 200, complex and integrated checks and analyses can be made by the processor to determine which products on the machine 200 should be rejected; which controls on the machine 200 should be adjusted and by how much to better ensure the production of a quality, qualifying product; which information should be displayed to operators; and which information should be retained for future analysis and display. By combining processing of sensor signals, tracing information, data collection, and control signals on a single processor 201, total integrated control over the machine 200 and the manufacturing process can be controlled, accelerated, and made more versatile. Machine control and manufacturing processing can take advantage of the speed and efficiency of a central processor utilizing off-the-shelf components and the flexibility possible with easily modified and added algorithms to provide sensory measurements, data analysis, and machine control.

In addition to the preferred rejection control feature, exemplary embodiments can also provide machine control of the machine 200 based on signals received by one or more sensors, such as those located at positions 112, 210, and 212. For example, an algorithm on the processor 201 can receive the weight measurement signals from sensor 112 and can analyze a trend in individual weight measurements to determine if the ecreteur wheel 114 needs adjustment or replacement. If the weight measurements are regularly too high, a control signal can be sent from the processor 201 across the communication path 202 to the machine 200 to instruct a gear box to raise the ecreteur wheel 114 to scrape more tobacco off the continuous rod. If, on the other hand, the measurement signals from sensor 112 to the processor 201 indicate that every sixth cigarette rod is too heavy in the middle of the cigarette rod, and if the scalloped ecreteur wheel 114 provides for the scraping of the equivalent of six cigarette rods during one revolution of the wheel, a message can be displayed on a screen or graphical user interface 204 or 206 to instruct the operator to replace the ecreteur wheel as having at least one improperly shaped edge.

Referring back to the continuous processing line of the machine 200, an additional sensor 212 detects for the presence of metal in the tobacco rod. Upon detection, a signal is sent to the processor 201 and is mapped with the timing signals to set a flag on the tracking array corresponding to the location of the metal in the tobacco rod. In a method similar to the rejection of cigarettes wrapped with spliced cigarette paper, the cigarette(s) in the proximity of the detected metal will be flagged in the tracking array for rejection. Because of the speed of the processor 201, the signals being received from the sensors and encoders on the machine 200 can be received across the communication path 202, processed by algorithms in memory of the processor 201, and incorporated into the tracking array at the proper relative location to the moving tobacco/cigarette rod without impacting the processing speed of the machine 200.

The wrapped cigarette rod proceeds through the measurement station 112 to location 108 where the rod is cut into individual or double length cigarettes. A rejection port can be located at 214 to eject any cigarettes that have been flagged in the tracking array to be rejected because of, for example, metal, paper splice, or weight failures. The finite, high speed control that is now possible with preferred embodiments is further exemplified with the operation of the multiple rejection ports on the machine, one of which can be located at 214. The machine 200 can eject one or a series of cigarettes, depending on the nature of the rejection, as discussed above. If, for example, a single cigarette is to be rejected, an algorithm on the processor 201 can advance the rejection process to ensure that only the single, targeted cigarette is ejected from the machine 200, thereby ensuring quality control and minimal waste.

Cigarette ejection from the machine 200 is preferably done by directing a blast of air at the targeted cigarette to blow it out of the production line. In such a case, solenoids controlling ejection air valves on the machine can be determined as requiring, for example, four timing cycles to open sufficiently to provide a stream of air to eject a cigarette. Therefore, in the case where each cigarette is comprised of, for example, 24 segments, the processor 201 can flag an entry in the tracking array at segment 20 of the cigarette that is preceding the cigarette to be ejected, to instruct the controller to begin opening the solenoid for the air valve at the rejection port 214. Therefore, by the time that segment 24 of the preceding cigarette has passed the rejection port 214, and when the cigarette to be ejected is just entering the rejection port 214, the flow from the now open air valve will be sufficient to eject the targeted cigarette; and the preceding cigarette will not be inadvertently ejected also or in lieu of. Similarly, the processor 201 can flag the tracking array to signal the solenoid to begin closing at segment 10 of the targeted cigarette, thereby ensuring that subsequent cigarettes are not incorrectly ejected.

Filters are added to the cigarettes from the filter hopper 120, and additional sensors 216 and 116 can detect such conditions as loose or missing filter, loose ends, and dilution value. The signals sent from each of these sensors 216 and 116 to the processor 201 are evaluated by one or more algorithms to determine whether the measurements indicate the product is in or out of specification. If the measurements are out of specification, the corresponding portion of the tracking array is flagged, and the non-conforming cigarette(s) can be ejected at port 118 as a out-of-specification product.

Sensor data transmitted from the machine 200 across the communication link 202 can be analyzed on the processor 201, as will be discussed more completely below, can be stored on a storage device 208, and/or can be transmitted across a network 218 to other users and other sites. The communication links 209 and 219 between the processor 201 and the storage device 208 and the network 218, respectively, can be any one or combination of known conduits or medium which can convey electronic signals from one device to another, such as hard-wired, wireless, or optic conduit or media. Additionally, while only one storage device 208 is shown and is labeled as being a database, any devices upon which data can be stored data, including a memory, multiple storage devices, and portable storage units, can be utilized for storing data, counts, and summaries used and generated by the processor 201 under exemplary embodiments of the system invention without detracting from the preferred features of the invention. Furthermore, the network 218 can be any one or more communications networks for the access and exchange of data and instructions, including the Internet, intranets, extranets, local area networks, radio frequency networks, and the like. Finally, an output device represented by the printer 220 can be available to print the results of any processing performed by the processor 201. While the above explanation is intended to explain the operation of exemplary embodiments as associated with a cigarette making machine, it will be understood by those of ordinary skill in the art that other conditions can be sensed by suitable sensors, which can send signals to the processor 201 across the communication path 202, where one or more algorithms can analyze the signals to determine appropriate inspection, reactive, rejection, and machine control steps to initiate. Further, a plurality of sensors and controls can be adjusted, enabled, and disabled by operator entry of parameters through displays or graphical user interfaces 204 and 206 as discussed below in association with FIGS. 8–10.

The preferred control features of exemplary embodiments include tracking control, rejection control, and machine control, as discussed below in conjunction with FIGS. 3–5, respectively. Each of these features can be implemented on a single processor 201 as part of an integrated control and rejection platform through the information transmitted from the machine 200 across the communication link 202 and through the information and pointers mapped onto the tracking array(s) maintained by the processor 201.

Figure 3:
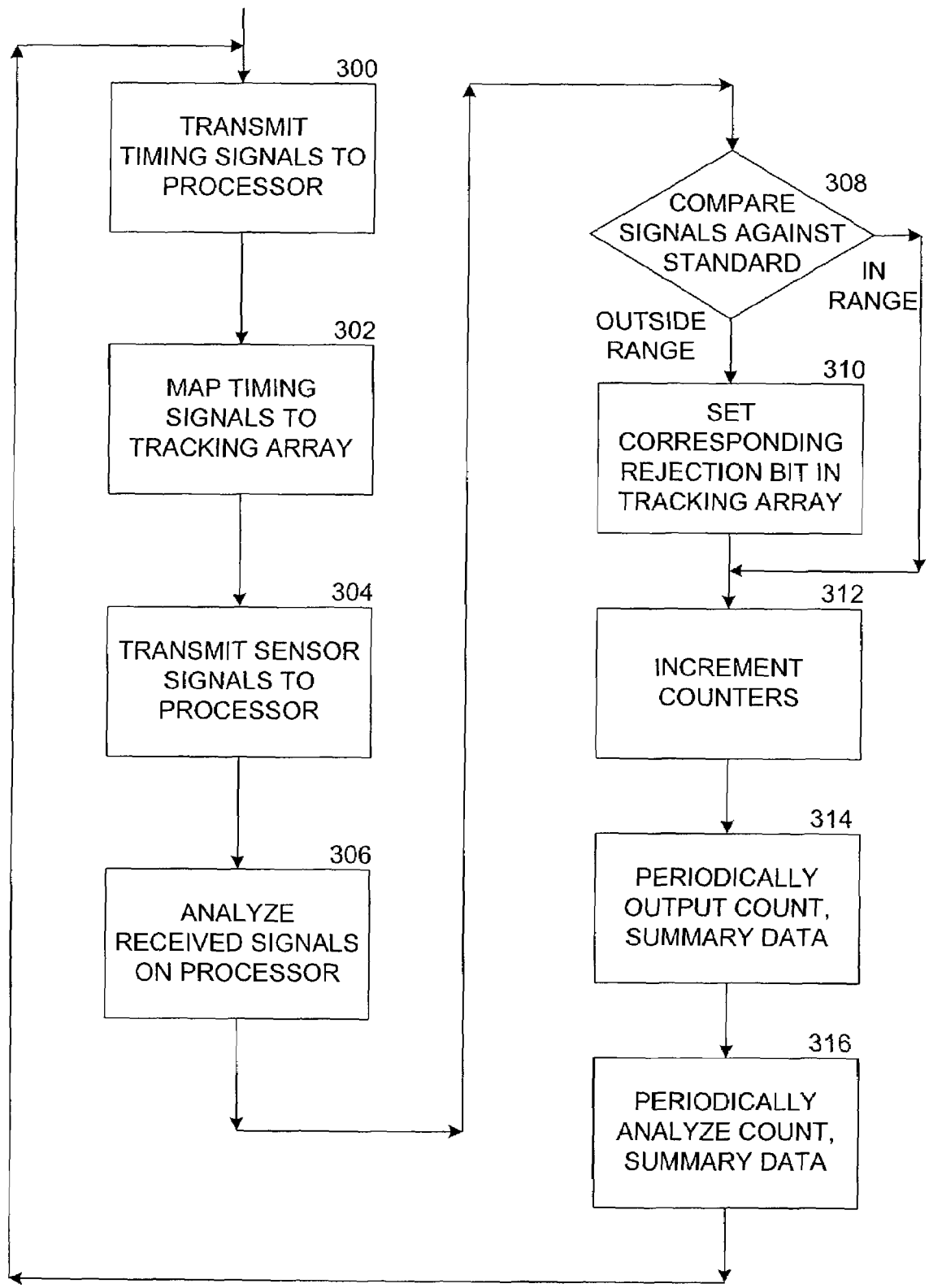
FIG. 3 shows a flow chart of an exemplary method for tracking control effected by an embodiment of the invention.

Referring now to FIG. 3, there is shown a flow diagram of an exemplary embodiment, displaying the steps of the tracking control feature as implemented with an exemplary sensor. This process can also be viewed as inspection control as bits are set in a tracking array, as sensor information from the machine 200 is compared against various standards to determine whether the sensors are detecting nominal or out-of-range conditions. At step 300, timing signals are sent from the machine 200 of FIG. 2 to the processor 201 as triggered by a drive shaft encoder or like signal-generating device on the machine 200 such that a regular stream of signals that correspond to the operating speed of the machine 200 are transmitted to the processor 201. The received timing signals are mapped at step 302 by the processor 201 to a fixed length tracking array on a positional basis, thereby creating a relative data structure whose content will reflect the processing events on the cigarette machine 200. If the cigarette machine 200 is a dual rod machine, then the processor 201 can have two tracking arrays in memory, one for each rod of tobacco. In this manner, exemplary embodiments can be easily expandable to accommodate multiple processing rods of tobacco or input from multiple machines 200.

At step 304, an exemplary sensor, which is one of many on or proximate to the machine 200, sends a signal to the processor 201. The signal can be in response to sensory functions available on the machine 200, such as the weight of segment 5 of a cigarette rod at location 112, the detection of metal in the rod by sensor 212, a loose filter detected by sensor 216, or the temperature in the space proximate to the machine 200. The received signal is processed by an algorithm on the processor 201 at step 306. The particular algorithm utilized by the processor 201 will be determined by the type of signal received and/or the sensor that transmitted the signal. In this manner, the appropriate function or software code can be efficiently applied to the signal without excess software being loaded into memory on the processor 201. If the received signal represents a hard failure condition at step 308, such as the detection of metal in the tobacco rod, then the processor flags, at step 310, the bits corresponding to the failed portion of the rod in that portion of the tracking array that is mapped, based on the timing signals and the timing of the received signal from the sensor, to the failed portion of the tobacco rod. The algorithm determines, based on the nature of the failure and/or the type of signal received, how many bits need to be flagged in the tracking array and at what relative position in the tracking array the bits need to be flagged to eject the failing portion of the tobacco rod and to avoid ejecting excessive product, as will be discussed in conjunction with FIG. 4. The algorithm can also determine which rejection port will be used to eject the cigarette(s). For example, as discussed above, the algorithm can flag the bits in the tracking array corresponding with segment 20 of the cigarette ahead of the failing cigarette and continuing through segment 10 of the failing cigarette. In this manner, 15 bits are flagged, and the air valve solenoid will be triggered to be open only as long as is required to positively eject a single, failing cigarette.

If the signals are sent from the weight measuring sensor 112 instead of the metal detection sensor 212, then the algorithm compares the received signal at step 308 against a weight range standard for the particular segment that has been measured, with the processor 201 cognizant of the segment whose weight signal has been received as a function of the timing of the received signal relative to the timing signals being received from the machine 200. If the received signal indicates the segment is outside the acceptable weight range, then the corresponding bits in the tracking array can be flagged at step 310 to ultimately cause the ejection of the cigarette when it reaches the targeted rejection port. In an alternative embodiment, the out-of-range condition encountered at step 308 need not be treated as an absolute failure of the particular cigarette or the portion of the tobacco rod. In this embodiment, multiple sensor signals can be input to an algorithm for analysis and ultimate decision regarding the retention or rejection of a portion of the product line. For example, if several segments of a cigarette rod are too light and several segments are too heavy, but the weight of the entire cigarette is within specification and the deviations are no more than 15% from the target weights, the algorithm can determine to not reject the cigarette. The process of "not rejecting" can take the form of resetting the corresponding bits in the tracking array to indicate an acceptable product, if the bits were originally flagged in step 310. One or more of the input signals can be weighted by the algorithm to assign greater importance to those signals. For example, if the first and last segment of the cigarette rod are out of the specified weight range, the cigarette can be flagged for rejection even if it otherwise satisfied the above analysis.

Figure 11:
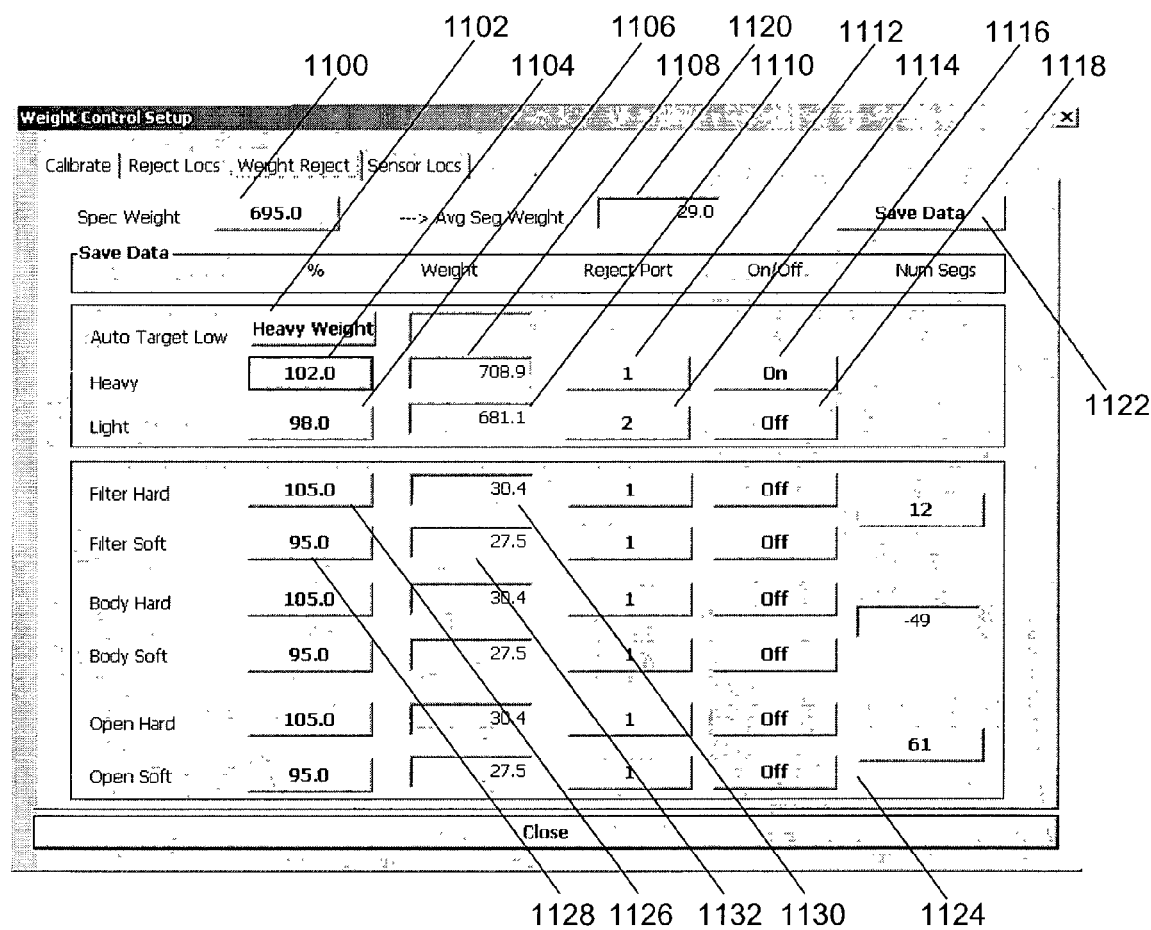
FIG. 11 is an exemplary screen display of the weight control rejection setup and display feature.

At step 312, the results of the previous steps are added to a series of counters that track such events as the number of cigarettes processed/made, the number of rejected cigarettes, and the number of rejects by rejection reason. At this time, the tracking array pointers are incremented in preparation to receiving signals from the next operational cycle. The counts are periodically output at step 314, as a function of time, count, or event, including a manual request by an operator, and can include count summary data. The counts and summary data can be output to an archival storage device 208, can be transmitted across a network 218 to another computer or storage device upon proper authorized access or inquiry, and/or can be displayed on a screen or graphical user interface 204 or 206 to an operator or engineer. Additionally, the data received by the processor 201 across the communication line 202, along with the counts and summary data calculated by the processor 201, can periodically be processed by one or more algorithms at step 316 for display in a meaningful manner, including trend analyses, and for reactive control of the machine 200, as discussed below in conjunction with FIG. 5. Several exemplary displays of the inspection control feature are shown in FIGS. 7 and 11.

Figure 4:
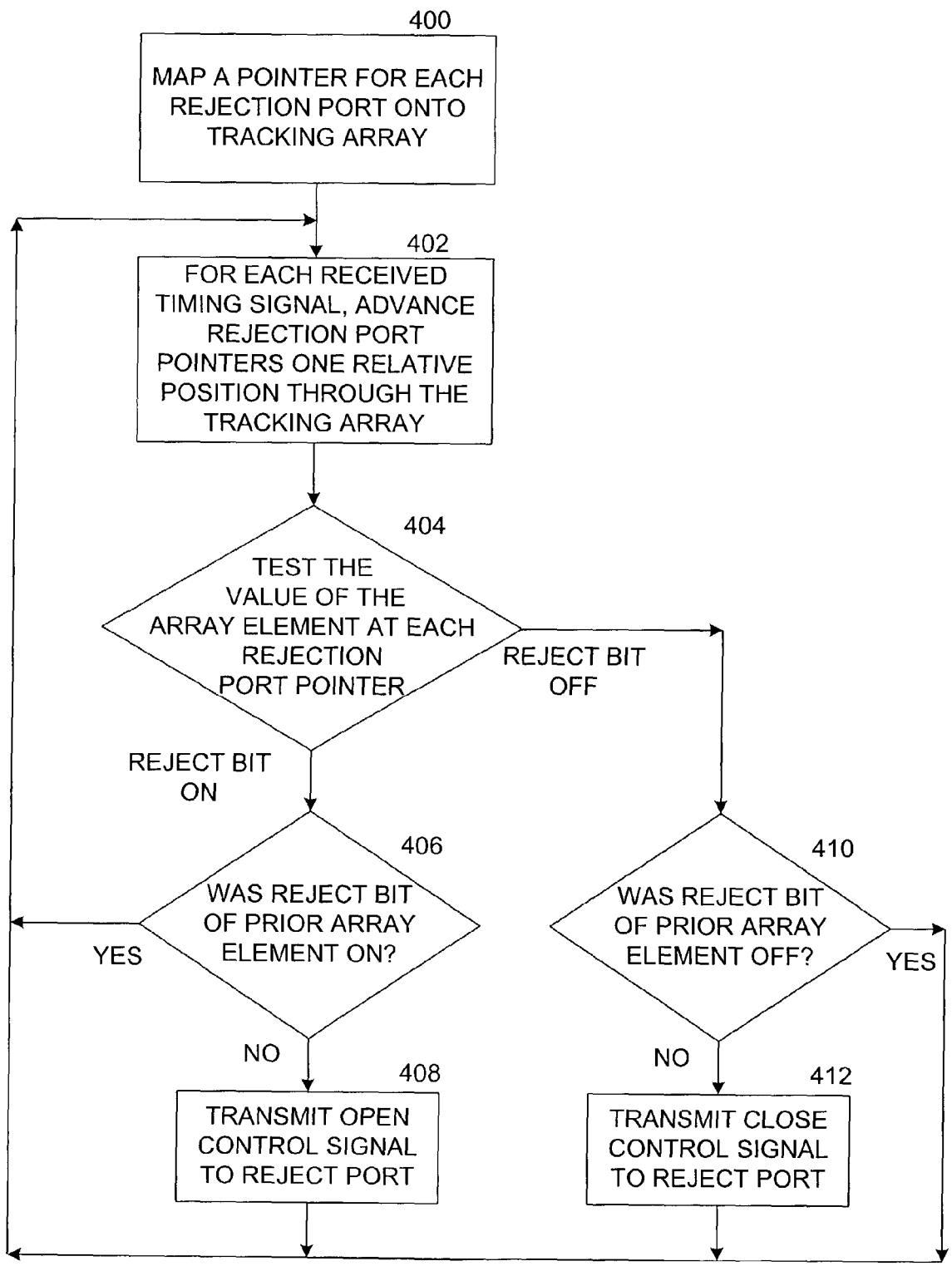
FIG. 4 shows a flow chart of an exemplary method for rejection control effected by an embodiment of the invention.

An exemplary method for rejection control effected by a preferred embodiment is shown in FIG. 4. The combination of the inspection control of FIG. 3 and the rejection control of FIG. 4 can be referred to as the motion control feature. At step 400, rejection port pointers to the tracking array are established, with one pointer being created and mapped onto the tracking array for each rejection port that is to be controlled on the machine 200, such as ports 216 and 118. Any number of ports can be accommodated by embodiments of the system, limited only by the physical constraints of the machine 200 and the memory and the speed of the processor 201. Each pointer is mapped onto the tracking array at the relative location in the tracking array associated with the position of the corresponding rejection port on the machine 200 and the number of timing signals required for the tobacco rod/cigarette rod to reach the rejection port from a reference zero location along the product line. For each timing signal received at step 402 at the processor 201, each of the rejection port pointers will be advanced one relative position, relative that is to the timing signal, through the tracking array. Each of the steps 404–412 will be processed for each rejection port pointer before the pointers are advanced with the reception of the next timing signal. However, the following discussion will explain the processing steps associated with a single pointer associated with a single rejection port.

Following the advancement of the pointer, the system tests at step 404 the value of the rejection bit at the pointer location in the tracking array. If the rejection bit is set on, the processing proceeds to step 406, where the system checks the value of the rejection bit at the immediately prior location in the tracking array. If the prior rejection bit was also on, then no operation is required, and the system returns to step 402 to process the next rejection port pointer. If all the rejection port pointers have been evaluated, then the system waits for the next timing signal to restart the process at step 402. If, at step 406, the rejection bit at the prior relative tracking array location was determined to be set off, then the system initiates a control signal at step 408 to be transmitted across the communication link 202 to the controller at the rejection port under consideration to instruct the controller to open the air valve at the rejection port. While the present discussion has presented air valves and solenoids as the physical devices effecting the ejection of rejected products from the manufacturing machine 200, exemplary embodiments can use any number of devices to eject or redirect products within the machine 200 without detracting from the inventive features of the control and rejection system. For example, the rejection port can comprise a switched gate whereby the processor 201 at step 408 directs a control signal to be transmitted across the communication line 202 to the controller at the rejection port to move a gate that redirects the product to another line or a waste bin.

If the rejection bit was determined to be set to an off designation at step 404, the rejection bit at the prior array element location is tested at step 410. If the rejection bit at the prior array location is also off, no action is taken by the system, and processing is reverted back to step 402 as discussed above. If, however, the rejection bit at the prior array location is determined to be on, this signals a change as regards the rejection bit at the present relative array location, and the processor 201 initiates the transmission of a control signal to the controller for the rejection port at step 412, instructing the controller to close the air valve.

Figure 5:
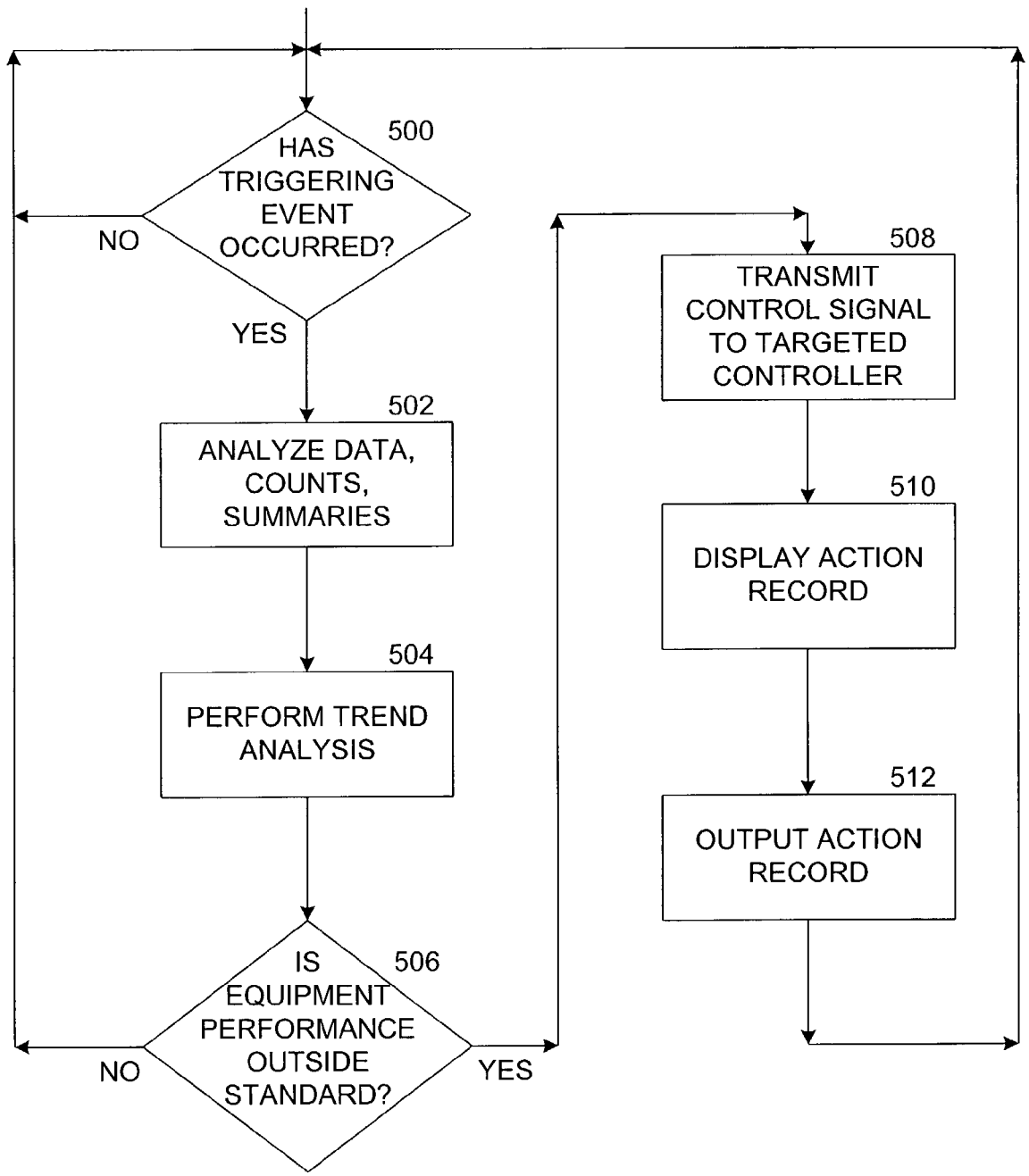
FIG. 5 shows a flow chart of an exemplary method for reactive equipment control effected by an embodiment of the invention.

The process of machine control, or reactive equipment control, as briefly discussed in relation to step 316 of the tracking control embodiment, is shown in more detail in FIG. 5. One of the advantages of the exemplary embodiments is the resources to route all the real time information associated with the manufacture of a product and the operation of the manufacturing machine 200 to a single processor 201, where the information can be processed in an integrated analysis to detect trends in the product line and/or the manufacturing process and to modify the operation of the manufacturing machine 200 to adjust for out-of-specification conditions. At various times during the production process and upon occurrence of various events in the manufacturing machine 200, a preferred process can be triggered at step 500 to analyze the data which has been received by the processor 201 from the manufacturing machine 200 and/or the data that has been created by the processor 201, such as counts and summary data. The particular timing events that can trigger such an analysis can include a periodic indicator, such as every thirty minutes during the production cycle or at specific, predetermined times during the day. Examples of particular events that can trigger an analysis can include the processing of a certain number of products, such as every 200,000 cigarettes; or encountering a certain number of rejected products, such as every 1,000 rejected cigarettes; or encountering a notable increase in the rate of rejections, such as the number of metal detection events per 10,000 cigarettes produced. Other triggering events can be related to the composition or quality of the product being produced, such the weight of the various segments of each cigarette, while within specification, being regularly toward the high or the low weight limit. Furthermore, this reactive equipment control feature can permit the consideration of combinations of production and product data so that an integrated triggering decision can be made. For example, for every 50,000 cigarettes, if the number of metal detections exceed 5, the number of cigarettes rejected based on weight variances exceeds 200, and the number of cigarettes rejected because of loose ends exceeds 50, then the system will trigger, at step 500, an analysis of the production/product data being received from the manufacturing machine 200.

At step 502 the data associated with the making of the product and with the product itself is analyzed. This data can include the real time information received from the machine 200 and can also include the count and summary data that has been created at steps 312 and 314 during the preferred tracking/inspection control feature. For example, the data analysis may show that the segment weights sensed at location 112 are consistently on the high or low end of the weight range, even if the weights are within predetermined acceptable limits. The data can be optionally or further analyzed at step 504 with one or more trend analyses. The one or more algorithms performing the data analyses and/or the trend analyses can be automatically determined by the system based on the particular event at step 500 that triggered the analysis. For example, a triggering event at step 500 that determines that the weight segments are consistently out of range can invoke an algorithm that analyzes at step 502 the weight segment data and initiates the transmission of a control signal to a gearbox controlling the operation of the ecreteur wheel 114.

The trend analysis performed at step 504 has the advantage of inputting real time data, count data, and/or summary data from one or more sensors on the machine 200 to analyze the performance of the machine 200 and/or the quality of the product being produced by the machine 200 across time and/or events. The amount of data available to either the data analysis at step 502 or the trend analysis at 504 is virtually unlimited because of the volume of data captured by the system, the constant creation of count and summary data, and the ability of the system to download data to and access data from disk storage 208. The usefulness of the analysis can be further enhanced by the versatility of the data available to be analyzed because the processor can have access to data from any and all the sensors on the machine 200. For example, the trend analysis at step 504 can indicate that the weight measurements sensed at 112 are creeping downward while the rejection rate per 1,000 cigarettes attributable to loose ends as sensed at 116 is increasing. The results of the data analysis from step 502 and/or the results of the trend analysis at step 504 are compared against appropriate standards at step 506, based on the triggering event and the conditions being analyzed, to determine whether the equipment performance is outside an acceptable standard level. For example, the trend analysis that indicates the weight of the cigarette rod is going down while the rejection rate attributable to loose ends is increasing can indicate, based upon experience programmed into the algorithms and performance standards, substandard equipment performance, whereupon control is passed to step 508 for corrective action. If the data and trend analyses indicate no equipment performance problems, control is passed to step 500 to await the next triggering event.

At step 508, a corrective control signal is transmitted from the processor 201 across the communication link 202 to a control device on the machine 200 to modify the operation of the manufacturing machine 200 by adjusting one or more components on the machine 200. In the above example, a corrective control signal can be transmitted to the gearbox controlling the ecreteur wheel 114 to lower the wheel 114, thereby increasing the weight along the entire cigarette rod and also increasing the tobacco quantity at each end of the cigarette rods, which experience has shown can remedy a loose ends situation. Additionally, or in the alternative, an error message can be displayed at step 510 on the screen 204 and/or 206 to notify an operator that corrective action is being taken and why the action is being taken or to notify an operator that an out of standard condition exists that requires operator intervention. The sequence of steps 508 and 510 can be reversed without detracting from the features of the invention. In the case where the action record is displayed to the operator prior to the control signal being transmitted, an request can be inserted in the display requesting the operator authorize the corrective action. If the operator fails to timely authorize the correction, the control signal is not transmitted to the machine 200. At step 512, one or more exception records are output, reporting the results of the data analysis, the results of the trend analysis, the particular out-of-standard condition determined, the authorization action taken by the operator, and/or the corrective control action taken by the system.

Through the reactive equipment control process, the operation of the machine 200 can automatically be kept within operating and performance standards and the quality of the product being manufactured by the machine 200 can be maintained within specific, predetermined limits, all without halting operation of the machine 200. The product tracking, product rejection, and machine control as integrated in exemplary embodiments comprise the reactive control of the entire product manufacturing process in combination with tracking the entire state of the process and machine 200 over a long period of time.

Figure 6:
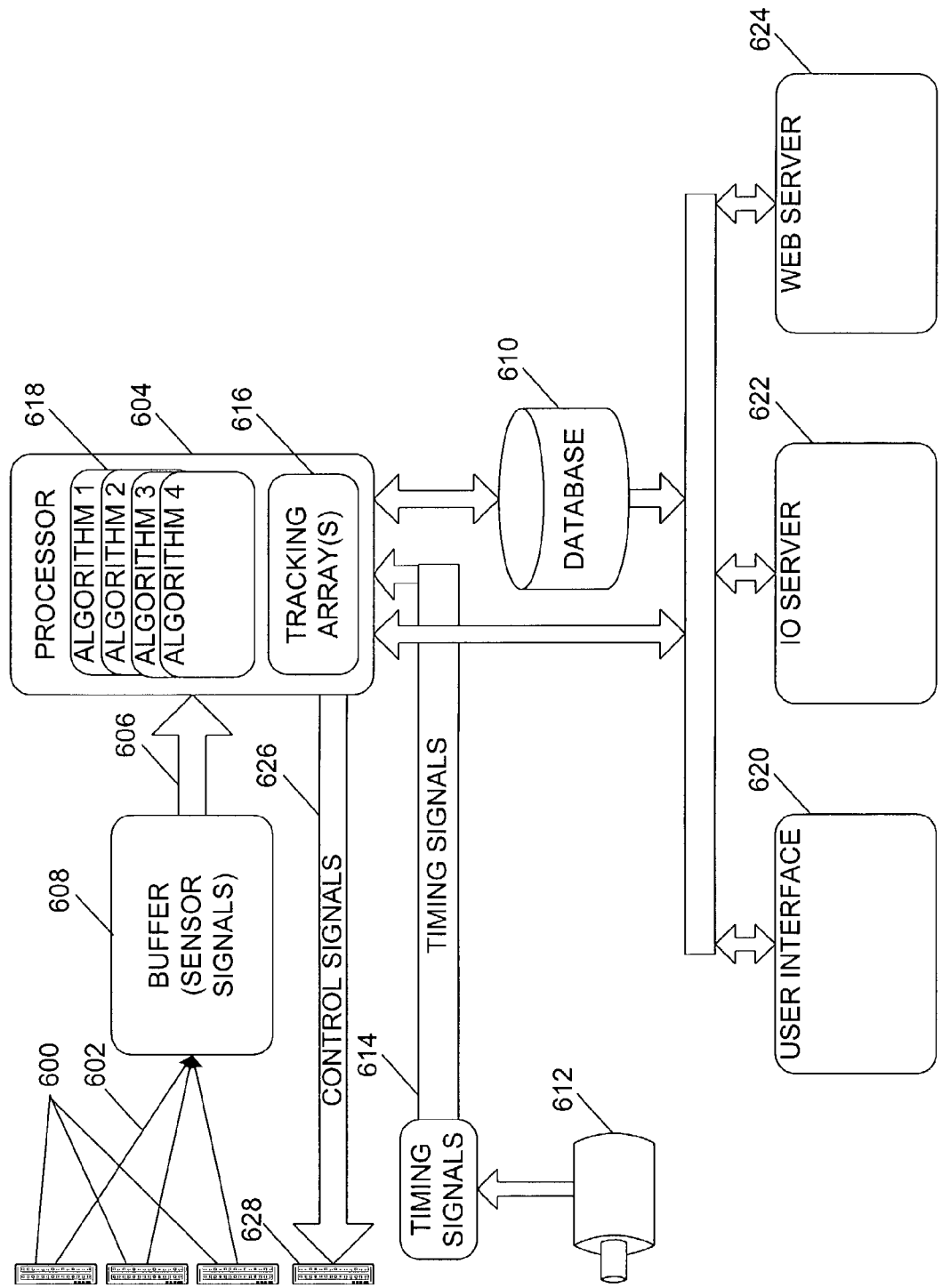
FIG. 6 shows a system diagram of an exemplary embodiment of the invention.

A system perspective of exemplary embodiments is shown in FIG. 6 that demonstrates the flow of data and signals for the tracking control of FIG. 3, the rejection control of FIG. 4, and the reactive equipment control of FIG. 5. At periodic intervals and upon occurrence of various events, the sensors 600 transmit sensor signals 602 to the processor 604 across a communications or transmission link 606. While only three sensors 600 are shown in FIG. 6, any number of sensors, including only one, can be implemented in exemplary embodiments without detracting from the features of the invention. The link 606 can be any one or more known conduits or medium for conveying signals, including, but not limited to hard wiring, optical cable, coaxial cable, and wireless communications. The signals 602 can be buffered at 608 but need not be. The signals 602 in the form of data can also be transmitted for storage on one or more memory or storage devices 610. A spinning shaft encoder 612, or like timing device associated with the manufacturing machine 200, can generate timing signals 614 which are transmitted to the processor 604 for ultimate mapping onto one or more tracking arrays 616 and for mapping to the sensor signals 602 by means of the execution of one or more algorithms 618 on the processor 604.

Many of the processes of the tracking control feature shown in FIG. 3 take place on the processor 604, with rejection bits being set on the tracking array(s) 616. While the tracking arrays 616 are shown as being integrated within the processor 604, the tracking arrays 616 can be considered to be data structures which can be typically stored in some type of memory, whether preferably within the processor 604 as shown in FIG. 6, separate from the processor 604, or incorporated with related data and/or database storage 610. The counts and summaries generated in steps 312 and 314 can be stored on the database 610 and can be displayed and can be accessible to operators and users through the user interface 620, the IO server 622, and the web server 624. The user interface 610 can include the displays 204 and 206 shown in FIG. 2; and the information can be accessible, with proper user authority and access through the web server 624 across the network 218 of FIG. 2. Access to the information can also be effected across local area networks, intranets, and the like through the IO server 622. In this manner, the processing information associated with the manufacturing machine 200 and the products being made can be made available locally and throughout the world. Exemplary embodiments can further provide for control instruction input, via secured and authorized access, through any of the interface and server accesses of 620, 622, and 624 to modify the operation of the machine 200 and the control and reporting functions.

The rejection control processes of FIG. 4 can also take place on the processor 604, with the control signals 626 being transmitted at steps 408 and 412 from the processor 604 to the control device 628 to modify operation of the machine 200. While only one control device 628 is shown in FIG. 6, any number of control devices can be implemented in exemplary embodiments without detracting from the features of the invention.

The decisions and data analyses associated with the reactive equipment control embodiment of FIG. 5 can also take place on the processor 604. The control signal 626 transmitted at step 508 under instruction by the processor 604 is directed to the targeted controller 628. The information records output in step 512 can be stored on the database 610 and can also be directed to the interfaces and servers of 620, 622, and 624 for ultimate display and/or access.

An exemplary display of a portion of the tracking array is shown in FIG. 7, with position 700 representing the relative position zero of the tracking array as mapped to the production line on machine 200 by use of timing signals. The tracking array can be viewed as a "positional-in"/"positional-out" array in that the pointers corresponding to cigarette rods, cigarette rod segments, sensors, rejection ports, control actuators, and the like are incremented through the array to reflect the movement of the tobacco product through the machine 200. In this manner, new data is not pushed into the "first" position in the array, and old data is not "dropped" from the last position of the array. Instead, sensor results and information is entered into the array at a relative position corresponding to the sensor pointer or location pointer at the time the sensor data or information is generated.

While the tracking array can display information at a bit level, including the rejection bit, the screen display shown in FIG. 7 is at a product level display, wherein location 702 shows 6 failing products, or cigarette rods, in the tracking array. The tracking array shows the status of the products and how the status was achieved, whether at a bit or segment level display or by a product item level display. Because the tracking array represents the conditions along a moving product line within an operating machine 200, the displayed bits or items in the display, such as items 702, move dynamically across the rows of the display from position 0 to position 399. In this manner, the actual operation of the machine 200 and the movement of the products through the machine 200 are displayable to the operator on screens 204 and 206 and across the network 218 to remote users and/or operators. The processor 201 maintains the series of pointers that move through the array as the rod passes through the machine 200, with each pointer associated with a sensor, a rejection port, and the like. The speed of the display can be slowed so that the movement can be appreciably viewed by a user or operator.

A rejection port is represented at location 704. If the flagged products at 702 are, for example, being rejected for being too heavy, and if the port 704 is the rejection port where these failing cigarettes are to be ejected, then the color of each of the products at 702 can be changed upon passing the location 704, visually representing their ejection from the machine 200. While multiple rejection ports can be displayed on a single screen, the display shown in FIG. 7 represents an example of how the weight control feature can be used, with 695 mg having been established as an exemplary specification weight of each single cigarette rod, as displayed at 710. The actual average weight of the last, say 200 cigarettes, is shown at 706 to be 698.7 mg. An operator-controllable machine target weight is shown at 708 to be 700 mg, which takes into consideration, or compensates for, known calibration errors or adjustments for the machine 200 needed to produce a cigarette with a specification weight of 695 mg. The resynchronization value at 712 indicates the number of resynchronizations the operator has initiated since this field was last reset to bring the machine and the production line into synchronization. A maximum weight has been set at 720 mg, as shown at 714, while weight of the latest cigarette produced on the machine 200 is shown at 716 to be 692.2 mg. 718 shows the standard deviation, in milligrams between the cigarettes being produced and the specification weight. The speed of the machine 200 in cigarettes produced per minute is shown at 720, and the machine is currently in a running mode, as indicated at 722. The array display key at 724 shows the display colors for the various product conditions and pointers shown on the tracking array.

Figure 8:
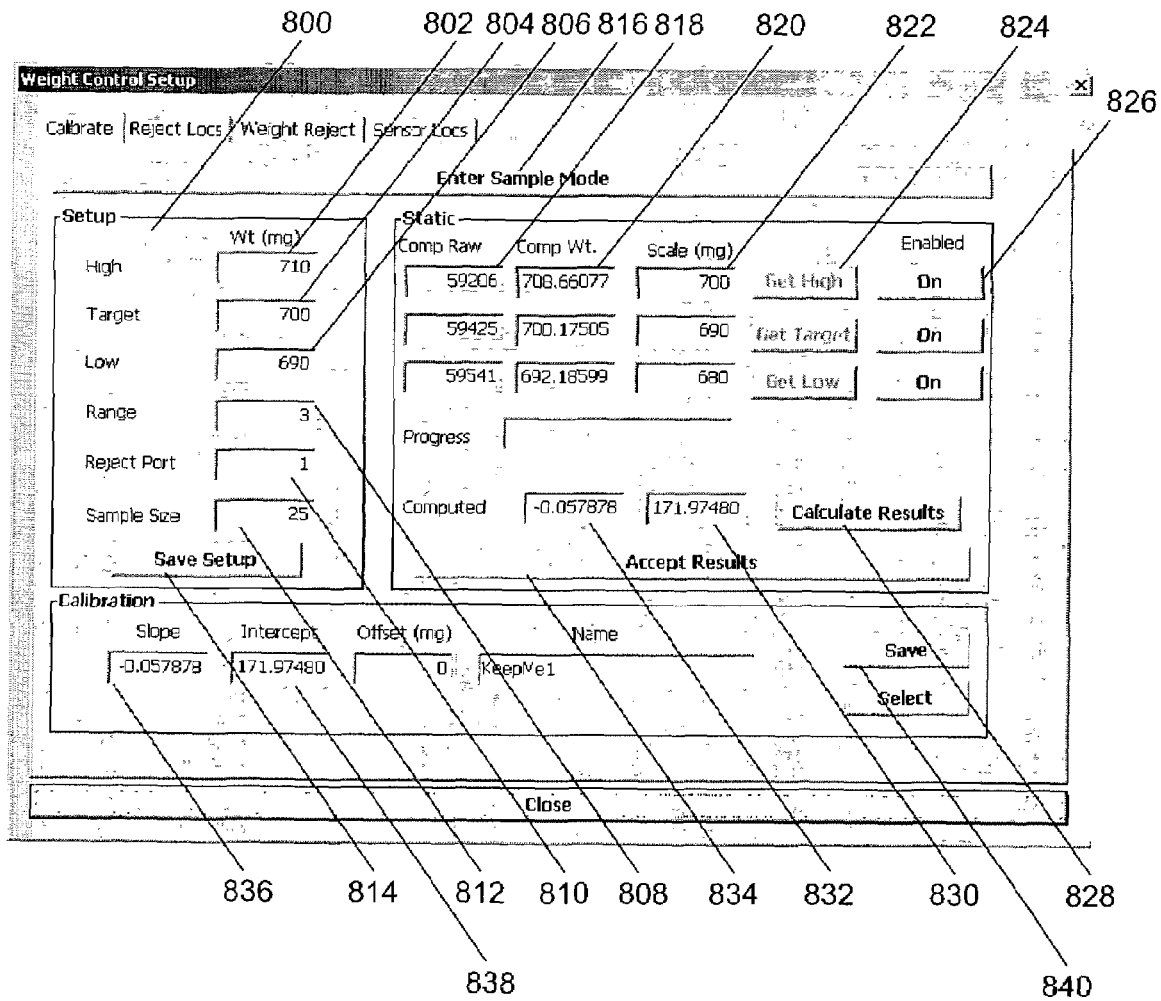
FIG. 8 is an exemplary screen display of the weight control calibration and display feature.

FIG. 8 shows an exemplary screen display of the weight control calibration and display feature, whereby an operator can modify the sensor calibration parameters of the machine 200 by setting up the weight range calibration points for the machine 200. The weight calibration setup portion of the screen is shown at 800 and comprises entry points for the High calibration point 802, the Target calibration point 804, and the Low calibration point 806. The exemplary display of FIG. 8 shows a High calibration point of 710 mg, a Target calibration point of 700 mg and a Low calibration point of 690 mg for each cigarette rod, as measured by sensor 112. These points represent desired points to be identified on the calibration curve. When the operator elects to collect calibration sample cigarettes within the weight Range 808 of any of the High, Target, or Low calibration points, the samples will be ejected at Reject Port 1 (810), such as rejection port 214 of FIG. 2. The operator can modify any of the parameters in the setup area 800 and can implement the changes in real time without stopping the machine 200 by clicking on the "Save Setup" button 814 with a mouse. Alternatively, the screen display of FIG. 8 can be implemented on a touch screen display wherein the operator can merely touch the Save Setup portion 814 of the screen to implement the setup change.

FIG. 8 also shows a preferred sampling feature, wherein by clicking on the Enter Sample Mode button 816, the machine 200 will enter the sample mode. This prevents the Reject Port defined at 810 from ejecting rejected cigarettes and allows the machine 200 to eject only those cigarettes which are at the selected sample value 802, 804, or 806 plus or minus the weight Range 808. After entering the sample mode, the operator can select which sample mode(s) is desired by pressing Get High 824, Get Target, and/or Get Low. Clicking or touching one of the sampling buttons 824 will cause 25 cigarettes to be ejected from the machine 200 at rejection port 1, as shown at 810 and 812. The Range 808 is set to provide a weight range on either side of the desired weight specification for ejecting qualified samples. For example, with a 3 mg range set at 808, the ejected samples will include cigarettes with a weight between 687 mg and 693 mg when the Get Low sample button 824 is pressed. The weight and sampling specifications can be saved by clicking on the Save Setup button 814.

The computer raw value 818 is the sum of the weight sensor raw values for the cigarettes actually ejected as samples, with window 820 showing the average weight of the 25 sampled cigarettes, based on application of the current calibration curve to the raw values collected in the sample. The scale weight 822 is entered by the operator as the actual scale weight of the 25 ejected cigarettes. Alternatively, the scale weight value can be automatically transmitted and entered from the scale itself. When the Calculate Results button 828 is clicked on or touched, the system calculates a new calibration curve (in this case, slope and intercept) using the raw values 820 collected and the scale weights 822 entered. The values at 830 and 832 can be used as a measure of the calibration deviation or error of the machine 200 or of a particular sensor and can be used to compensate for the deviation so as to produce cigarettes within specification notwithstanding a deviation within the machine 200 or a sensor. By enabling a weight specification at 826, the actual and sensed weight values for that specification are included in the calculated results shown at 830 and 832. The calibration results may be accepted by clicking on or touching the Accept Results button 834. Upon the results being accepted, the system moves the calibration results to the Slope 836 and Intercept 838 fields. The operator can apply an offset (in milligrams per cigarette), if desired, and save the calibration using its current name "KeepMe1" in this example or giving the calibration a new name. Alternatively, these calibration names can be controlled by a naming table with a drop down menu. Activating the Save button 840 will save the calibration in a database set aside for that purpose, such as database 610 of FIG. 6 or alternatively in the processor 604.

Figure 9:
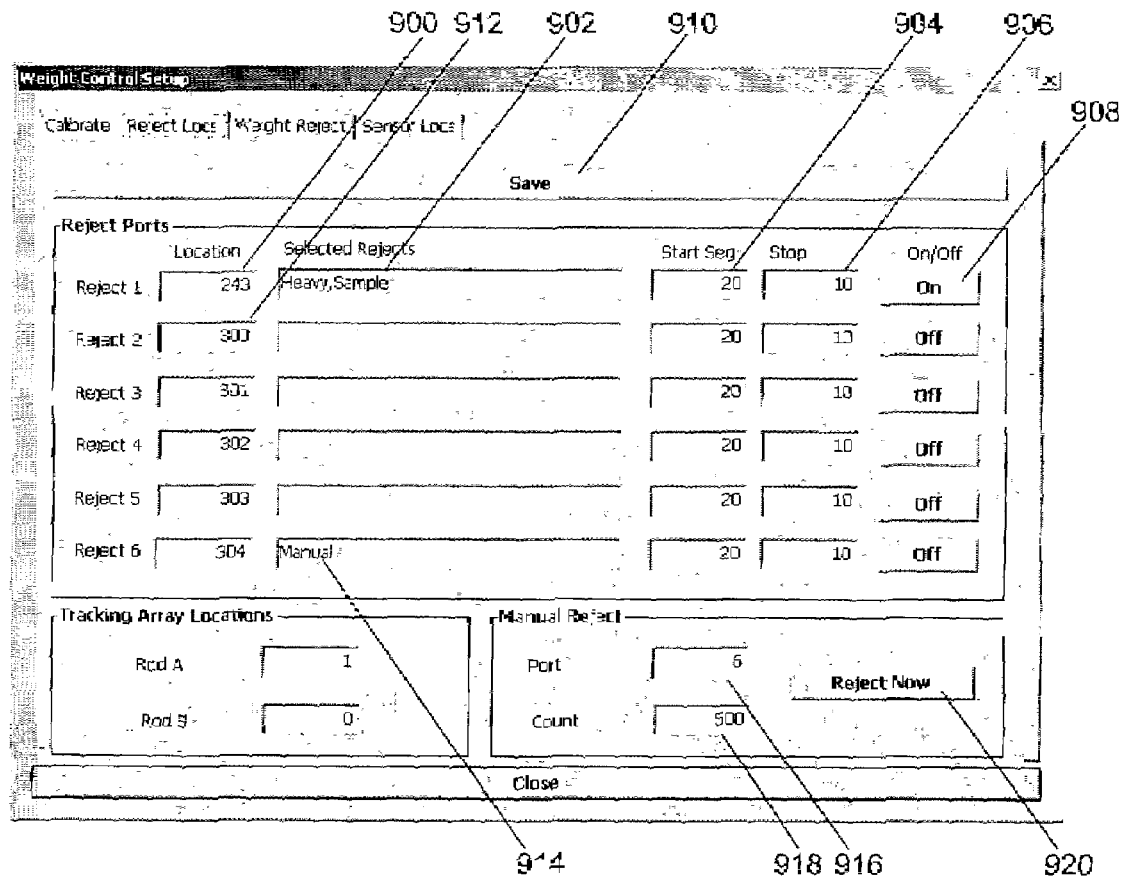
FIG. 9 is an exemplary screen display of the rejection port setup and display feature.

FIG. 9 shows an exemplary screen display of the rejection port setup feature, wherein an operator can display and/or modify the various rejection ports on the machine 200. While six rejection ports are shown in FIG. 9, any number of rejection ports can be implemented with exemplary embodiments of the system, as discussed above regarding FIG. 4. Each of the settings shown in FIG. 9 can be modified by the operator by entering the desired number in the appropriate window and clicking on the Save button 910. Mouse, touch screen, or other known devices for entering information through a display screen can be utilized to enter, modify, and save settings and parameter information. The relative location of the first rejection port in the tracking array is shown in window 900 as being at position 243. This location corresponds to the relative position of the first rejection port as also shown on the tracking array in FIG. 7. Similarly, the relative location of the second rejection port is shown in window 912 as being at position 300. The relative location of each rejection port can be modified by changing the contents of the location windows, such as 900 and 912. The description at window 902 indicates that this particular rejection port has a dual function of ejecting cigarette rods that are too heavy and ejecting calibration samples from the cigarette rods.

The rejection port action, as discussed above regarding the weight control feature of the machine 200, is set to begin at segment 20 in window 904 and set to stop at segment 10, as shown in window 906. The On/Off setting 908 is set to "On" to signify that the first rejection port is active. Rejection port number 6 is designated at 914 as being the port on the machine 200 where cigarettes will be ejected upon an operator command when the Reject Now button 920 is pressed or an external reject button is activated. The operator can change the manual rejection port in window 916 and can control the quantity of cigarettes ejected at window 918 and when the cigarettes are to be ejected with button 910.

FIG. 10 shows an exemplary display of the sensor location setup screen, wherein 1000 indicates the relative identifier for each sensor on the machine 200. The name of the sensor is shown at 1002, with the name field intended to represent the particular specification for which the sensor determines a value. The location at 1004 represents the location of each of the sensors. The location number 1004 for each sensor represents the sensor's relative position in the tracking array, relative to the weight sensor, which in this embodiment is assigned a relative location of zero. For example, the metal detection sensor is shown in FIG. 10 to be located two positions ahead of the weight sensor in the tracking array, which also corresponds to the relative positions of the sensors along the production line. The particular rejection ports at which the non-conforming cigarettes are ejected from the machine 200 for each specification are shown at 1006. As can be seen for the missing filter and the band missing sensors, a single rejection port can be used to eject cigarettes which have been rejected as being out of conformance with any one or more specifications. The # Reject 1008 column indicates the number of cigarettes to be ejected for each instance of the fault. The enabled buttons/indicators at 1010 can be set to enable or disable the operation of any of the sensors. For the On Value field at 1012, a "TRUE" value indicates that the occurrence of voltage from the sensor indicates a fault, or non-conforming, condition. "FALSE" indicates a lack of voltage reading is indicative of a fault condition.

Turning now to FIG. 11, there is shown an exemplary screen display of the weight control rejection setup and display feature. The various settings can be modified, as in FIG. 9, by entering the desired number in the appropriate window and hitting the Save Data button 1122. The specification weight for each individual cigarette rod is set at window 1100 to be 695.0 mg. The average segment weight is displayed at 1120 to be 29.0 mg because for this particular example there are 24 segments in each cigarette rod, with 695 mg divided by 24 being 29.0 mg. Window 1104 is set at 102%, which when multiplied times the specification weight of 695 mg, results in the display at 1108 of a maximum allowable weight for each cigarette rod of 708.9 mg. Window 1112 shows that the rejection port for a heavy cigarette is port 1, which is presently enabled, as shown by the "On" displayed in window 1116. The low weight limit has been set to be 98% at window 1106, which corresponds to a light weight limit of 681.1 mg, as shown in window 1110. Underweight cigarettes can be ejected at rejection port 2, as indicated at window 1114; but will not be ejected according to the display of FIG. 10 because the rejection for light cigarettes is currently turned off, as indicated in window 1118.

The rod segment portion 1124 of the display permits display and modification of weight limits by particular segments of each cigarette rod. For example, the segment corresponding to the filter end of the cigarette rod has been set to have high and low weight limits of 105% and 95%, respectively, as shown in windows 1126 and 1128. These percentages result in an actual acceptable weight range of 30.4 mg to 27.5 mg for this particular segment, as displayed in windows 1130 and 1132. Presently, as shown in window 1124, a rejection of a rod for being out of weight specification at the filter end of the cigarette would be ejected at port 1, but will not be because this particular rejection feature is not enabled, as shown by the "Off" setting.

Figure 12:
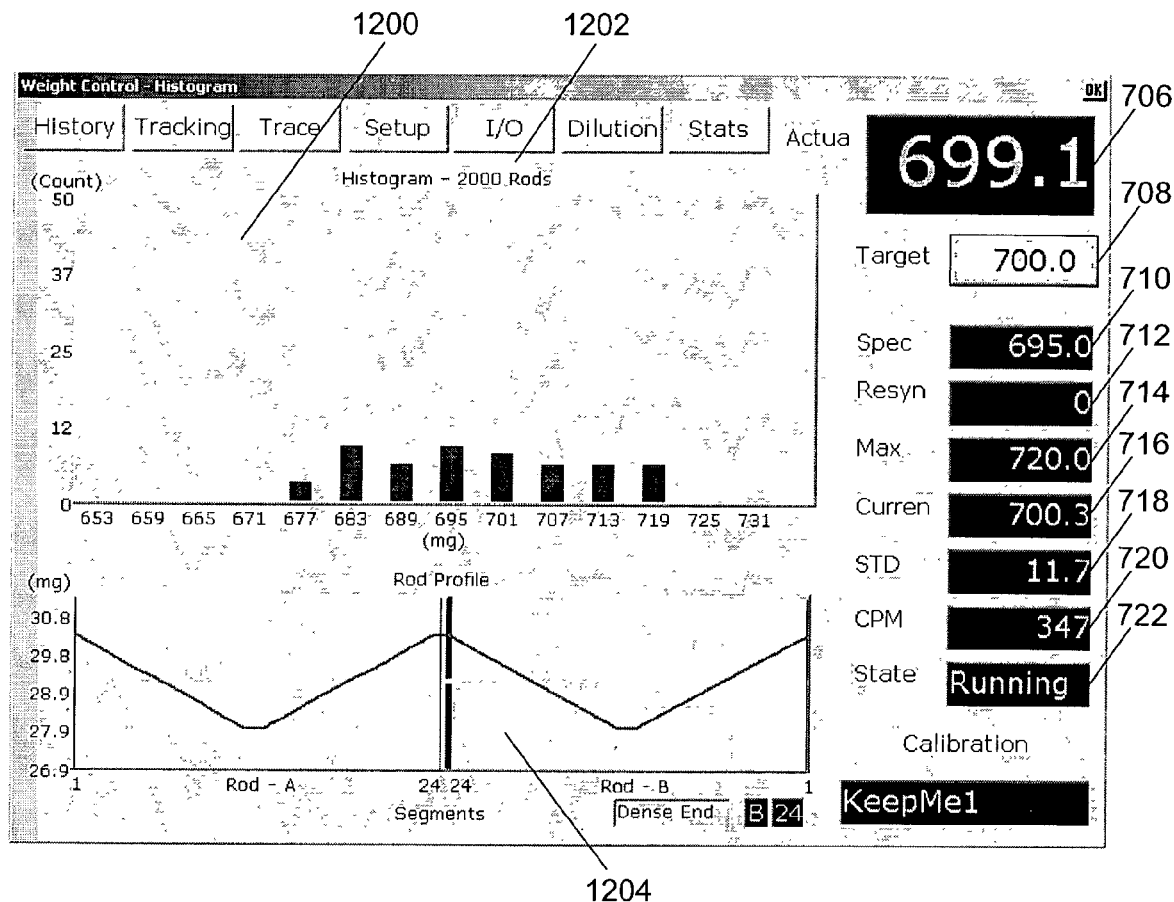
FIG. 12 is an exemplary screen display of the dual histogram and rod profile display feature.

A graphical display of the weight history of cigarette rods being produced by the machine 200 is shown in FIG. 12, along with a display of the segment weights of an average cigarette rod being produced by the machine 200. The bar histogram display at 1200 shows the relative distribution of cigarette rods being produced with various weights on either side of the specification weight of 695 mg. The information from which the display is built is drawn from a sampling of cigarettes rods produced on the machine 200, without any need to stop the production process. For example, a representative sampling from which the information is gleaned can be the last 2,000 cigarettes produced by the machine 200, as shown at 1202. The display of FIG. 12 can inform the operator at a glance how consistent the rod weights are and whether the machine is tending to produce under-weight or over-weight cigarette rods. As discussed above regarding the ecreteur 114, the weight of each cigarette rod is not consistent across the length of the cigarette and is heavier at each end of the cigarette. Display 1204 shows the weight profile of a dual cigarette rod, wherein rod A and rod B will eventually be cut at the segment 24 location and where the heavier ends of the individual cigarettes are graphically displayed.

Although preferred embodiments of the invention have been shown and described, it will be appreciated by those skilled in the art that changes may be made in these embodiments without departing from the principle and spirit of the invention, the scope of which is defined in the appended claims and their equivalents.

What is claimed is:

1. A method for controlling the manufacture of a product, comprising the steps of:
   sensing at least one condition associated with a quality of a product being manufactured on a manufacturing device;
   transmitting a sensor signal representative of the sensed condition to a central processor;
   comparing, at the central processor, the transmitted sensor signal against a standard associated with the sensed condition, wherein the step of comparing includes selecting an algorithm on the central processor based on the sensor signal transmitted to the central processor;
   transmitting a control signal to a controller on the manufacturing device should the comparison against the standard indicate an out-of-standard condition; and
   displaying a tracking array on a graphical user interface as representative of the product moving through the manufacturing device.

2. The method according to claim 1, wherein the product comprises a cigarette and wherein the sensed condition includes at least one of out-of-weight tobacco, metal detected in tobacco, paper splice of cigarette wrapper, loose end of filter, missing filter, and air leaks.

3. The method according to claim 1, wherein one or more parameters of the standard associated with the sensed condition can be modified in real time.

4. The method according to claim 1, wherein the transmitted control signal instructs the controller on the manufacturing device to effect the rejection of the product being manufactured on the manufacturing device.

5. The method according to claim 1, wherein the transmitted control signal instructs a controller on the manufacturing device to adjust a component on the manufacturing device.

6. The method according to claim 1, further comprising the steps of:
  generating timing signals on the manufacturing device;
  transmitting the timing signals to the central processor; and
  mapping, by the central processor, the transmitted sensor signal to the tracking array based on the transmitted timing signals.

7. The method according to claim 1, wherein the product comprises a plurality of cigarettes moving through said manufacturing device.

8. A method for controlling the manufacture of a product, comprising the steps of:
  sensing at least one condition associated with a quality of a product being manufactured on a manufacturing device;
  transmitting a sensor signal representative of the sensed condition to a central processor;
  comparing, at the central processor, the transmitted sensor signal against a standard associated with the sensed condition;
  transmitting a control signal to a controller on the manufacturing device should the comparison against the standard indicate an out-of-standard condition;
  displaying a tracking array on a graphical user interface as representative of the product moving through the manufacturing device;
  generating timing signals on the manufacturing device;
  transmitting the timing signals to the central processor;
  mapping, by the central processor, the transmitted sensor signal to the tracking array based on the transmitted timing signals; and
  changing the appearance of the displayed array elements representative of the product as the product is ejected at a rejection port on the manufacturing device.

9. The method according to claim 8, further including analyzing the transmitted sensor signals to generate counts, summaries, and/or trends representative of the operation of the manufacturing device.

10. The method according to claim 9, further including transmitting a control signal to a controller for adjusting a component on the manufacturing device should a trend analysis indicate an out-of-standard condition.

11. An integrated method for providing reactive equipment control, whereby product processing on a manufacturing device is controlled by a one or more algorithms operating on a single processor, comprising the steps of:
  tracking the processing of a product on a manufacturing device;
  displaying a tracking array on a graphical user interface as representative of the product moving through the manufacturing device;
  ejecting non-conforming products from the manufacturing device;
  controlling processing steps on the manufacturing device, wherein the ejecting and controlling steps are based on sensor signals initiated during the tracking step and wherein the tracking, ejecting, and controlling steps are implemented on a single processor; and
  transmitting the sensor signals from the manufacturing device to the single processor, wherein algorithms are selected to operate on the processor based on the sensor signals received by the processor.

12. The method according to claim 11, wherein the products are cigarettes and wherein the non-conforming products are ejected based on at least one of out-of-weight tobacco, metal detected in tobacco, paper splice of cigarette wrapper, loose end of filter, missing filter, and/or air leaks.

13. A data structure for displaying the processing of a product through a manufacturing device, comprising:
  a tracking array, wherein each element of the tracking array is mapped through manufacturing device timing signals to segments of a product moving through a production line on a manufacturing device, and wherein the tracking array is displayed on a graphical user interface as representative of the product moving through the manufacturing device;
  pointers to locations in the tracking array representative of ports on the manufacturing device; and
  appearance elements which change the displayed appearance of tracking array elements as the product segments represented by the tracking array elements pass rejection ports on the manufacturing device where the product is ejected from the production line.

14. The data structure according to claim 13, wherein the product comprises a cigarette and wherein the product is ejected based on at least one of out-of-weight tobacco, metal detected in tobacco, paper splice of cigarette wrapper, loose end of filter, missing filter, and/or air leaks.

15. A cigarette manufacturing apparatus, comprising:
  a machine adapted to manufacture cigarettes;
  a plurality of sensors for measuring a plurality of conditions associated with the operation of the machine, wherein the sensors are adapted to inspect cigarettes being manufactured by the machine and for transmitting measurement signals;
  a processor configured to receive the measurement signals transmitted from each of the inspection sensors;
  a plurality of controllers configured to modify a cigarette manufacturing process on the machine, wherein the processor evaluates the received measurement signals against one or more standards and transmits control signals to one or more of the plurality of controllers to maintain the cigarette manufacturing process within performance standards, the apparatus including a computer readable medium encoded with computer-executable instructions to provide reactive equipment control, wherein the cigarette manufacturing processing is controlled by one or more algorithms operating on a single processor, including tracking the manufacturing processing of individual cigarettes on the machine; ejecting non-conforming cigarettes from the machine; and controlling the manufacturing processing on the machine, wherein the ejecting and controlling processes are based on sensor signals initiated during the tracking of the processing of the cigarettes and wherein the tracking, ejecting, and controlling processes are implemented on a single computer, the one or more measured conditions including at least one of out-ofweight tobacco, metal detected in tobacco, paper splice of cigarette wrapper, loose end filter, missing filter, and air leaks.

16. A method for controlling the manufacture of a product, comprising the steps of:
sensing at least one condition associated with a quality of a product being manufactured on a manufacturing device;
transmitting a sensor signal representative of the sensed condition to a central processor;
comparing, at the central processor, the transmitted sensor signal against a standard associated with the sensed condition;
transmitting a control signal to a controller on the manufacturing device should the comparison against the standard indicate an out-of-standard condition;
generating timing signals on the manufacturing device;
transmitting the timing signals to the central processor;
mapping, by the central processor, the transmitted sensor signal to a tracking array based on the transmitted timing signals;
displaying the tracking array on a graphical user interface as representative of the product moving through the manufacturing device; and
changing the appearance of the displayed array elements representative of the product as the product is ejected at a rejection port on the manufacturing device.

17. A method for controlling the manufacture of products comprising the steps of:
generating a tracking array representing the position of a plurality of products on a machine during manufacture and displaying the tracking array on a graphical user interface as representative of the products moving through the manufacturing device;
receiving timing signals representative of a change of position of the plurality of products on the machine;
incrementing a position of a first pointer relative to the position of the plurality of products in the tracking array based on the receipt of the timing signals, wherein the first pointer represents a sensor of the machine; and
writing a value to the position of one of the plurality of products in the tracking array when the first pointer has the same position as the one of the plurality of products in the tracking array.

18. The method of claim 17, further comprising:
reading the written value with a second pointer in the tracking array when the first pointer has incremented to the same position as the second pointer, wherein the first pointer corresponds to a sensor of the machine and the second pointer corresponds to a rejection port of the machine; and
instructing the machine to reject the one of the products which is located at the rejection port if the read value is indicative of non-conformance.

19. The method of claim 18, including modifying the appearance of the first pointer in the tracking array when the product represented by the pointer has been rejected.

20. The method of claim 18, wherein the plurality of products are tobacco products.

21. The method of claim 18, wherein the first pointer and the second pointer have a predetermined position relative to each other corresponding to a position of the sensor and the rejection port of the machine.

22. The method of claim 17, wherein the position of the first pointer is incremented by moving the first pointer through the tracking array while the position of the second pointer in the tracking array is fixed.

23. The method of claim 17, wherein sensors and rejection ports on the machine can be enabled and disabled by operator entry of parameters.

24. A method of controlling the manufacture of products comprising the steps of:
generating a value indicative of the conformity of each product responsive to output of a sensor at a first location along a machine; and
controlling a machine operation at a second location along said machine, said second location a predetermined distance from said first location;
said controlling step comprising the steps of:
generating a timing signal indicative of movement of products through the machine;
accessing a tracking array having positions representing a sequence of products moving through said machine and displaying the tracking array on a graphical user interface as representative of the products moving through the machine;
repetitively moving a writing pointer to first positions along said tracking array in correlation with movement of the products through said first location along the machine;
repetitively moving a reading pointer to second positions along said tracking array in correlation with movement of the products through said second location along the machine;
writing the generated value onto the respective first position along the tracking array with said writing pointer;
reading the written generated value at the respective second position along the tracking array with said reading pointer; and
executing said machine operation based on said read generated value.

25. The method of claim 24, wherein said machine operation is a rejection operation.

26. The method of claim 24, wherein the products are cigarettes.

* * * * *